United States Patent
Stella et al.

(10) Patent No.: US 9,567,232 B1
(45) Date of Patent: Feb. 14, 2017

(54) METHOD FOR PREPARING SODIUM CHLORO-ALUMINATE

(71) Applicant: General Electric Company, Schenectady, NY (US)

(72) Inventors: Albert Santo Stella, Voorheesville, NY (US); Sergei Kniajanski, Clifton Park, NY (US); Paul William Buckley, Ballston, NY (US); Barbara Ellen Miebach, Malta, NY (US); Elliott West Shanklin, Altamont, NY (US); Paul Edward Howson, Latham, NY (US); David Winfield Woodruff, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/831,357

(22) Filed: Aug. 20, 2015

(51) Int. Cl.
  *C01F 7/54* (2006.01)
  *C01F 7/00* (2006.01)

(52) U.S. Cl.
  CPC .................................. *C01F 7/002* (2013.01)

(58) Field of Classification Search
  CPC ..................................................... C01F 7/002
  USPC ......................................................... 423/463
  See application file for complete search history.

(56) References Cited

U.S. PATENT DOCUMENTS

| | | | | |
|---|---|---|---|---|
| 3,832,452 | A | * | 8/1974 | Crouch, Jr. ............... C01F 7/62 423/463 |
| 4,076,794 | A | * | 2/1978 | Smith ...................... C01F 7/48 423/462 |
| 4,846,943 | A | | 7/1989 | Coetzer et al. |
| 6,733,738 | B1 | | 5/2004 | Ohrem |
| 6,767,665 | B1 | | 7/2004 | Ohrem et al. |
| 6,824,702 | B1 | | 11/2004 | Ohrem et al. |
| 8,110,301 | B2 | | 2/2012 | Iacovangelo et al. |
| 2012/0258359 | A1 | | 10/2012 | Saka |
| 2013/0136980 | A1 | | 5/2013 | Bartling |
| 2013/0196209 | A1 | | 8/2013 | Hart et al. |

(Continued)

FOREIGN PATENT DOCUMENTS

| | | |
|---|---|---|
| EP | 1152982 B1 | 5/2005 |
| FR | 2168912 A1 | 9/1973 |

OTHER PUBLICATIONS

Mohandas et al., "Design, construction and operation of a laboratory scale electrolytic cell for sodium production using a β-alumina based low-temperature process", Journal of Applied Electrochemistry, vol. 32, Issue 12, Dec. 2002, pp. 1383-1390.

*Primary Examiner* — Ngoc-Yen Nguyen
(74) *Attorney, Agent, or Firm* — Francis T. Coppa (57) ABSTRACT

Different methods for the preparation of high purity $NaAlCl_4$ are disclosed. The methods includes charging a feed having an intimate mixture of aluminum chloride, sodium chloride, and aluminum metal, to a reactor at an initial temperature less than about 80° C., carrying out a solid state reaction to form a solid $NaAlCl_4$ at an intermediate temperature less than about 145° C., melting the formed solid $NaAlCl_4$ at an elevated temperature greater than about 150° C. to produce molten phase $NaAlCl_4$, holding the reactor at a raised temperature greater than about 165° C. to substantially complete formation of colorless $NaAlCl_4$ and filtering the reactor contents at a final temperature greater than about 165° C.

20 Claims, 6 Drawing Sheets

(56) References Cited

U.S. PATENT DOCUMENTS

2014/0132221 A1  5/2014  Galloway et al.

* cited by examiner

METHOD FOR PREPARING SODIUM CHLORO-ALUMINATE

BACKGROUND

The invention relates generally to preparation of sodium chloro-aluminate, and particularly to an improved process for the preparation of high purity sodium chloro-aluminate.

A battery is a component used to store a portion of the energy in mobile systems such as electric vehicles and hybrid electric vehicles (for example locomotives, off-highway mining vehicles, marine applications, buses and automobiles), and for stationary applications such as uninterruptible power supply (UPS) systems and "Telecom" (telecommunication systems). The high-temperature sodium/metal halide electrochemical cells are generally targeted for use in industrial transportation, telecommunication, and uninterruptible power supply (UPS) batteries. These cells could potentially offer high energy density, high power density, longer cell life, and lower cost-requirements for many of these applications.

Sodium/nickel chloride batteries are one of the most widely used batteries among the many types of sodium/metal halide batteries. Sodium/nickel chloride batteries utilize molten sodium as the anode, nickel chloride as the cathode, and molten sodium chloro-aluminate (alternately sodium tetrachloroaluminate, $NaAlCl_4$) as a secondary molten electrolyte in the cathode.

Production of $NaAlCl_4$ normally includes reacting aluminum chloride with sodium chloride and then purifying the product obtained to the required grade to be used in a sodium/nickel chloride battery. Fabrication of a large batch of $NaAlCl_4$ usually takes 2-3 days' time until a sufficiently pure, clear colorless melt is formed. Impurities in the electrolyte reduce battery performance and may result in rupture of the cell. Sufficient information is not available about any in-situ determination of the reaction completion or the determination of the amount of impurities present in the formed product. It would therefore be desirable to develop a commercial method for the speedy production of $NaAlCl_4$ with accurate measurement of reaction completion and in-built measures for purifying the $NaAlCl_4$ product and measuring the impurity level of the product.

BRIEF DESCRIPTION

Some embodiments of the present invention provide a method for the preparation of high purity $NaAlCl_4$. In one embodiment, the method includes charging a feed to a reactor at an initial temperature less than about 80 degree Celsius (° C.), carrying out a solid state reaction to form a solid $NaAlCl_4$ at an intermediate temperature less than about 145° C., melting the formed solid $NaAlCl_4$ at an elevated temperature greater than about 150° C. to produce molten phase $NaAlCl_4$, holding the reactor at a raised temperature greater than about 165° C. to substantially complete formation of colorless $NaAlCl_4$, and filtering the reactor contents at a final temperature greater than about 165° C. The feed to the reactor includes an intimate mixture of aluminum chloride, sodium chloride, and aluminum metal; and the filtering step removes residual reactants and by-products of the process.

In another embodiment, a method for the preparation of high purity $NaAlCl_4$ includes charging a feed to a reactor at an initial temperature less than about 50° C., carrying out a solid state reaction to form a solid $NaAlCl_4$ at an intermediate temperature less than about 145° C., melting the formed solid $NaAlCl_4$ at an elevated temperature greater than about 150° C. to produce molten phase $NaAlCl_4$, holding the reactor at a raised temperature greater than about 165° C. to substantially complete formation of colorless $NaAlCl_4$ and filtering the reactor contents at a final temperature greater than about 180° C. and pressure greater than about 0.8 bar-gauge. The feed to the reactor includes an intimate mixture of aluminum chloride, sodium chloride, and a high surface area aluminum metal. The sodium chloride in the feed is in excess in an amount greater than about 1%, compared to a stoichiometric level of sodium chloride required for a complete chemical reaction producing $NaAlCl_4$. The average surface area of the high surface area aluminum metal flakes in the feed is greater than about $0.05\ m^2/kg$ of produced $NaAlCl_4$.

In yet another embodiment, a method for the preparation of high purity $NaAlCl_4$ in a semi-continuous mode is provided. An initial step of the method includes charging a feed having an intimate mixture of aluminum chloride, sodium chloride, and aluminum metal, to a reactor at an initial temperature less than about 80° C., carrying out a solid state reaction to form a solid $NaAlCl_4$ at an intermediate temperature less than about 145° C., melting the formed solid $NaAlCl_4$ at an elevated temperature greater than about 150° C. to produce molten phase $NaAlCl_4$, holding the reactor at a raised temperature greater than about 165° C. to substantially complete formation of colorless $NaAlCl_4$ and filtering the reactor contents at a final temperature greater than about 180° C. and pressure greater than about 0.8 bar-gauge. At least about 15 volume percent of the reactor contents is retained in the reactor and a subsequent feed having an intimate mixture of aluminum chloride, sodium chloride, and aluminum metal is charged to the reactor. The charging rate is controlled to keep a reaction temperature of the subsequent feed in a range from about 156° C. to about 190° C., to avoid freezing the reactor contents and to minimize volatile reactant losses. The process further includes holding the reactor at a raised temperature greater than about 165° C., to substantially complete formation of colorless $NaAlCl_4$ and repeating filtering, charging and holding steps to semi-continuously form the high purity $NaAlCl_4$.

DRAWINGS

These and other features, aspects, and advantages of the present invention will become better understood when the following detailed description is read with reference to the accompanying drawing, wherein.

DETAILED DESCRIPTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances, the event or capacity cannot occur. This distinction is captured by the terms "may" and "may be".

Several embodiments disclosed herein are directed towards an improved process to produce $NaAlCl_4$ electrolyte. Some embodiments disclosed herein are aimed at producing an electrolyte of purity that can meet battery performance, by using a process that is faster than any currently practiced processes. The processes disclosed herein significantly reduce cycle time and improve the quality of the $NaAlCl_4$ product obtained.

Different embodiments of the process include one or more steps of using a mixed feed to allow for solid state reaction, a prescribed heating profile to allow for solid and liquid reactions with reduced reactant losses, a filtering process to remove particulate and excess reactants, addition of a prescribed level of excess sodium chloride to allow for reaction completion while minimizing side product formation, addition of aluminum metal at a specified time and having a prescribed surface area for cycle time reduction, improved product color, and easy removal from the resultant purified product, a filtered sample system to assess reaction completion, an addition of mixed feed to a molten product to reduce cycle time and improve reactor productivity, and a product storage system that allows for inert transport and re-heating/treatment of the product.

Figure 1:
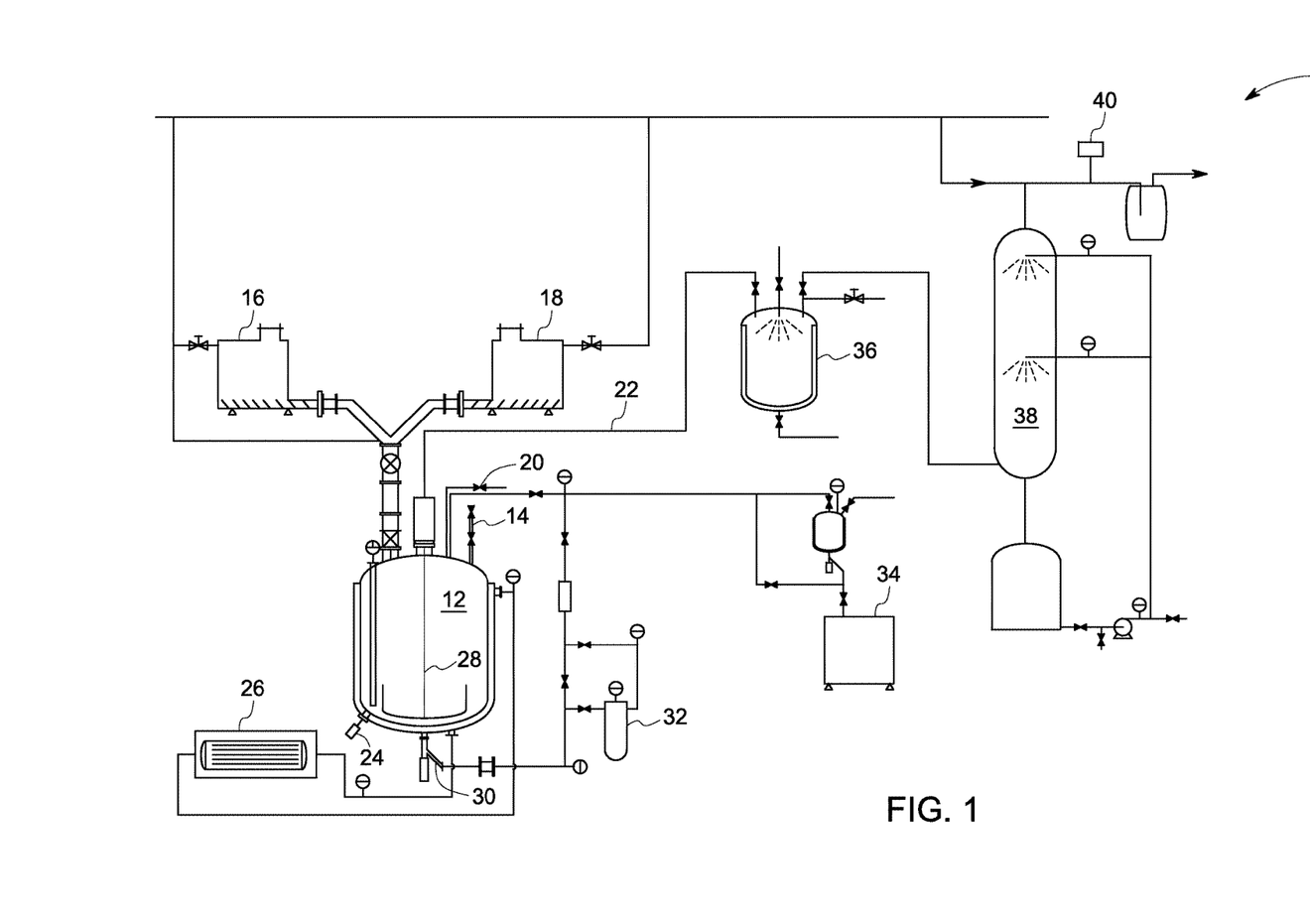
FIG. 1 is a schematic of a system used for producing a high-purity $NaAlCl_4$, according to an embodiment of the present invention.

FIG. 1 shows a schematic of an exemplary system 10 that may be used for the production of $NaAlCl_4$. The system includes a reactor 12 with an aluminum charge inlet 14, an $AlCl_3$ charge bin 16, and a sodium chloride (NaCl) charge bin 18, for charging the reactor. A charging of aluminum to the reactor may be carried out through the aluminum inlet 14 or along with the sodium chloride charging through the charge bin 18. In some embodiments, the aluminum is mixed with the sodium chloride prior to charging, and the charging of the mixture is carried out through the charge bin 18. The system 10 may further include gas inlet port 20 for inert gas purge and/or optional sparge, gas vent system 22 for pressure reduction and gas output for analysis, sample port 24 for sampling a reaction mixture, a heating means 26 for increasing reactor temperature, an agitator 28 for mixing, and a heated product discharge valve 30 for the product output. The reactor 12 may have a shape aiding proper mixing of the reactants, and may further have a sufficient surface area in contact with a heating surface (not shown) of the heating means 26 for enabling adequate and fast heat-transfer to the reactants for the reactions to take place inside the reactor 12. In some embodiments, the system 10 includes a pressure filter 32 for filtering out the products, an inert and heated product container 34, an overhead solids trap and wash system 36, an acid vapor scrubber 38, and an in-line gas chromatography (GC) monitor 40.

An overall reaction to produce sodium chloro aluminate ($NaAlCl_4$) is a 1:1 molar reaction of sodium chloride (NaCl) with aluminum chloride ($AlCl_3$), as shown below:

$$AlCl_3 + NaCl \rightarrow NaAlCl_4 \qquad (1)$$

At the reaction temperature, aluminum chloride may exist as a dimer $(AlCl_3)_2$. Therefore, the overall reaction may be shown as below:

$$(AlCl_3)_2 + 2NaCl \rightarrow 2NaAlCl_4 \qquad (2)$$

This reaction can take place in solid state at temperatures above 80° C., and in molten suspension at a temperature higher than about 140° C. After this temperature, aluminum chloride partial pressure increases significantly and reaches 1 atm at about 180° C. Therefore, temperatures higher than about 165° C. are not recommended at the initial reaction stage in order to avoid the loss of aluminum chloride vapor to the reactor overheads.

$AlCl_3$, by nature, is hygroscopic, and therefore can absorb a large quantity of moisture, if handled under humid conditions. Handling in inert, and/or dry conditions can largely reduce the moisture level present in $AlCl_3$. Nevertheless, there may be certain parts per million (ppm) level of moisture along with $AlCl_3$ due to exposure during packing and transporting. This moisture present may convert $AlCl_3$ into a form of a hydrate, $AlCl_3 \cdot xH_2O$. Over time, this hydrate may decompose to produce various aluminum chloro-hydroxy compounds and hydrogen chloride (HCl), as in examples shown below:

$$AlCl_3 \cdot xH_2O \rightarrow Al(OH)_yCl_z + HCl \qquad (3)$$

Aluminum chloride can also react with water at high temperature to produce HCl.

$$2AlCl_3 + H_2O \rightarrow Cl_2Al-O-AlCl_2 + HCl \qquad (4)$$

$$AlCl_3 + H_2O \rightarrow (AlOCl)_n + 2HCl \qquad (5)$$

The HCl produced is an impurity in the $NaAlCl_4$ product and is soluble or may form a complex in the product. Thus, if a battery cell is fabricated using electrolyte contaminated with HCl, metallic components of the cell may react with HCl generating hydrogen, and therefore the battery may then be subject to over-pressure at operating temperatures above 300° C., and fail. It has been found by the present inventors that the various aluminum oxychlorides that may remain in the molten $NaAlCl_4$ after complete removal of HCl, are inert to the cathode component and do not affect the electrolyte performance in terms of its melting point and ionic conductivity. Therefore, it is important to remove HCl from the $NaAlCl_4$ product during or after the reaction (1) to ensure good product quality of $NaAlCl_4$.

Therefore, in certain embodiments disclosed herein, aluminum metal is added to scavenge HCl turning it back into AlCl$_3$. Aluminum scavenges HCl through the reactions as shown below.

For monomer AlCl$_3$:

(⅓)Al+HCl→(⅓)AlCl$_3$+(½)H$_2$↑     (6)

For dimer (AlCl$_3$)$_2$:

(⅔)Al+2HCl→(⅓)(AlCl$_3$)$_2$+H$_2$↑     (7)

Figure 2:
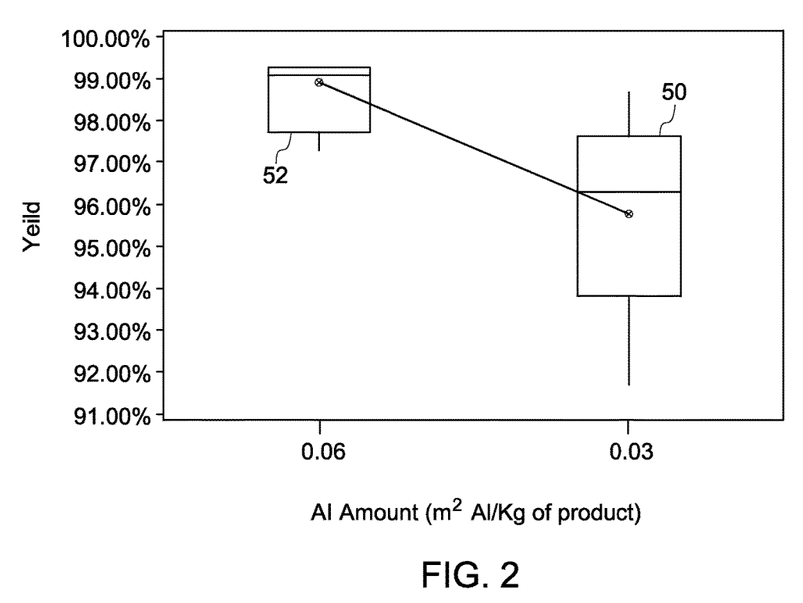
FIG. 2 shows a boxplot of one-way ANOVA for a yield of $NaAlCl_4$ formed with respect to an amount of aluminum added, according to an embodiment of the present invention.

Thus, by the addition of aluminum metal, the HCl impurity may be removed and the chlorine content may be recovered and returned to reactant AlCl$_3$ to participate in equation (1) or (2) to form NaAlCl$_4$. The by-product hydrogen (H$_2$) formed is not soluble in NaAlCl$_4$ and can be easily removed as a gas. Therefore, in some embodiments, a method for the preparation of high purity NaAlCl$_4$ includes charging a feed having aluminum chloride, sodium chloride, and aluminum metal to a reactor. FIG. 2 shows a boxplot of one-way ANOVA for the NaAlCl$_4$ yield with respect to quantity of aluminum metal in the initial feed. A low aluminum addition of about 0.03 m$^2$ of aluminum per 1 kg of the product produced, in the initial feed resulted in a low yield 50 of about 95.5%, while a higher aluminum addition (0.06 m$^2$ of aluminum per 1 kg of the product produced) in the initial feed resulted in a high yield 52 of greater than 98.5%. Thus, an aluminum addition in high quantity enables higher yield of NaAlCl$_4$ with less variation, as compared to a lesser quantity of aluminum addition.

In some embodiments, the feed has an intimate mixture of all the three reactants—aluminum chloride, sodium chloride, and aluminum metal. As used herein, an "intimate mixture" denotes an intimate physical contact of reactants (including aluminum metal) and hence good proximity of reactants with one another for rapid reactions. "The feed has an intimate mixture of all the three reactants" means that the aluminum chloride, sodium chloride, and aluminum metal are in intimate physical contact with one another prior to charging the reactor to affect reaction during heating in the reactor. This intimate physical contact reduces AlCl$_3$ vaporization during heating and allows for rapid scavenging of HCl formed by the reaction of moisture with AlCl$_3$. As seen by reactions (6) and (7), when aluminum metal is used to scavenge HCl, the soluble HCl in the NaAlCl$_4$ reaction mixture is converted to H$_2$ gas. Hence, the level of hydrogen chloride in the reaction mixture and the kinetics of its reaction with aluminum may be measured by measuring the evolution of hydrogen in the reactor. In some embodiments, an in-line gas chromatography (GC) technique is used to quantify the hydrogen gas evolved from the reactor and thus determine how much HCl has been converted.

In certain embodiments, the reactants—AlCl$_3$, NaCl, and aluminum metal have a surface area that is sufficient to achieve the intimate physical contact with one another. In some embodiments, the AlCl$_3$ used is in a powder or granular form with an average diameter of the powder or granule less than about 0.5 millimeter. In one embodiment, the average particle size of AlCl$_3$ powder or granule is adjusted such as to have substantial surface area to have intimate physical contact with NaCl to form NaAlCl$_4$, simultaneously reducing moisture absorption through surface.

The NaCl used herein in some embodiments may be a fine powder with an average particle size greater than about 30 micrometers and less than about 2 millimeters. Similar to AlCl$_3$, surface area of NaCl may also be optimized to enhance intimate physical contact and to reduce moisture absorption.

In certain embodiments, the aluminum metal used herein has a high surface area. A high surface area of aluminum metal along with intimate contact with AlCl$_3$ and NaCl promote scavenging of the evolved HCl at a fast rate. Therefore, in some embodiments, a surface area of aluminum metal is greater than about 10 m$^2$/kg of Al. However, the surface area of aluminum metal should also be low enough to decrease surface oxygen on the aluminum metal in the form of alumina (Al$_2$O$_3$). Al$_2$O$_3$ present on the surface of alumina metal reacts with HCl and undesirably produces moisture. Further, a very fine aluminum metal powder may be difficult to handle and may even pass through a filter during filtration of NaAlCl$_4$, and appear as an impurity in the NaAlCl$_4$ produced. Therefore, in certain embodiments, the surface area of aluminum used herein is less than about 100 m$^2$/kg of Al. In some embodiments, aluminum flakes or granules are used instead of aluminum powder. Aluminum flakes do not present any explosive or dust hazard, and are easier to handle than aluminum powder. Aluminum flakes used herein may have any geometry, and in some embodiments have a surface area in between about 4 m$^2$/kg of Al and about 50 m$^2$/kg of Al.

The amount of aluminum metal used, in the form of granules, powders or flakes, generally depends on the total moisture present in the reactants, including the moisture present as a part of the aluminum metal itself—in the form of surface oxide. In some embodiments, it is desirable to restrict total residual moisture in the intimate mixture of reactants to less than about 1500 ppm. In one embodiment, the total residual moisture in the intimate mixture of reactants is less than about 1000 ppm. In a further embodiment, the total residual moisture in the intimate mixture of reactants is restricted to less than about 500 ppm.

The desired quantity of aluminum metal in the reactant mixture herein depends on the surface area of the aluminum metal available for HCl scavenging. Therefore, in some embodiments, a total surface area of aluminum metal available for the reaction may be independent of the actual amount of aluminum metal present as a part of the reactants. In certain embodiments, the aluminum metal used herein is in the form of flakes with an average thickness less than about 100 microns, and an average surface area greater than about 0.05 m$^2$/kg of NaAlCl$_4$ produced.

Figure 3:
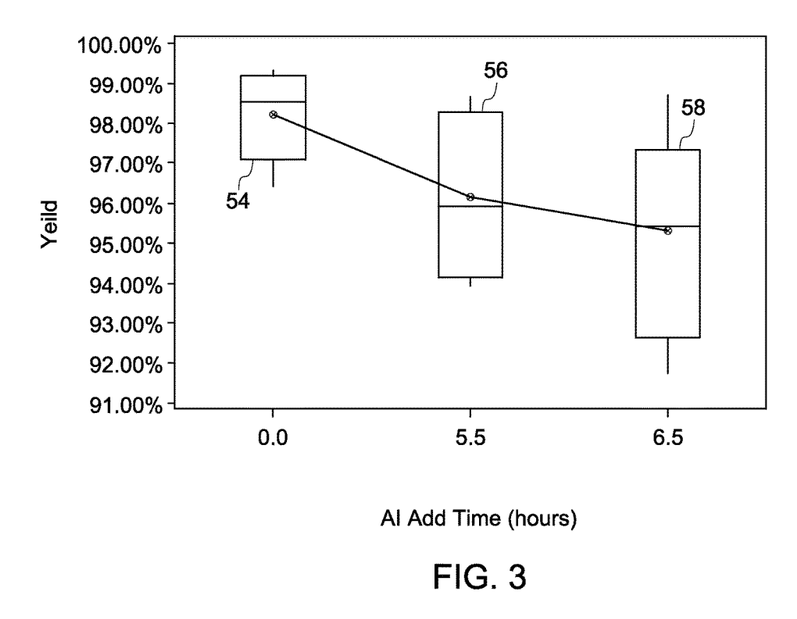
FIG. 3 shows a boxplot of one-way ANOVA for a yield of $NaAlCl_4$ formed with respect to time of addition of aluminum, according to an embodiment of the present invention.

FIG. 3 shows a boxplot of one-way Analysis of variance (ANOVA) for a yield of NaAlCl$_4$ formed in a 150 liter capacity reactor, with respect to time of addition of aluminum. A yield 54 greater than about 98% obtained when the aluminum is added in the initial feed is clearly higher compared to the yield 56 of about 96% that was obtained by the addition of aluminum after 5.5 hours of the initiation of reaction, and a yield 58 of about 95% that was obtained by the addition of aluminum after 6.5 hours of the initiation of reaction. Thus a higher variability and lesser yield of NaAlCl$_4$ is evident as a function of delay in the time of aluminum addition to the reaction mixture. Therefore, it is particularly advantageous to add aluminum metal to the reaction mixture in the early stages of reaction. In some embodiments, the feed contents—aluminum chloride, sodium chloride, and aluminum metal are mixed intimately prior to charging the reactor, which is denoted as "mixed feed" hereinafter.

Figure 4:
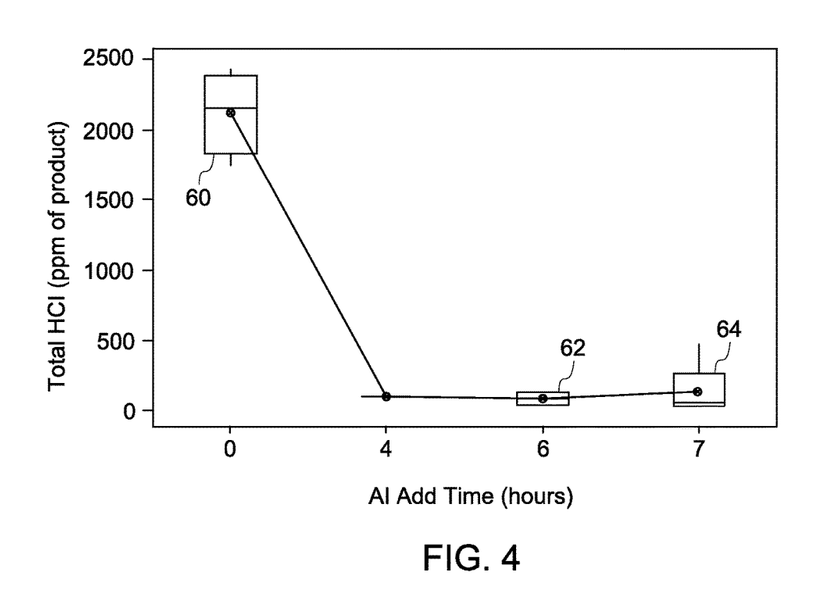
FIG. 4 shows a boxplot of one-way ANOVA for total HCl reacted with respect to time of addition of aluminum, according to an embodiment of the present invention.

It was experimentally found that HCl formed in reactions (3), (4), and (5) is present either in a vapor phase or dissolved in the molten phase. Dissolved HCl may be present in three forms: weak complexes with $NaAlCl_4$, strong compounds with various aluminum oxychlorides, and a highly corrosive "super acid" $HAl_2Cl_7$. While weak HCl complexes with $NaAlCl_4$ react with aluminum quickly, HCl associated with aluminum oxychlorides and in the form of super acid take much longer time to be removed. In addition, the super acid, if allowed to be formed, quickly corrodes certain types of metal parts of the reactor. Therefore, a later addition of aluminum than during initial charging of the reactor may cause a delay in removing HCl and may cause significant reactor corrosion. FIG. 4 shows a boxplot of total HCl involved in the reaction with respect to time of addition of aluminum in a 150 liter capacity reactor. It can be seen from FIG. 4 that a higher level of HCl is reacted with aluminum that is added early in the reaction. Specifically, when aluminum is added as a part of the initial feed (at 0 hours), HCl reacted with aluminum 60 seems to be greater than about 2000 ppm of product, as compared to the reacted HCl 62 when aluminum is added after 6 hours of reaction initiation and the reacted HCl 64 when aluminum is added after 7 hours of reaction initiation.

Therefore, it is particularly advantageous to add aluminum early enough, at low temperatures, in the reactor, thereby reducing HCl concentration and corrosion. In certain embodiments, the reactants containing the intimate mixture of feed including aluminum metal is charged to the reactor at an initial temperature less than about 80° C. In some embodiments, the initial feed including aluminum metal is charged to the reactor at room temperature. The presence of aluminum in the reactor ensures that HCl is rapidly scavenged and prevented from causing the product discoloration and/or contamination. In some embodiments, such as in a semi-continuous mode of operation, the initial feed including aluminum metal is charged to the reactor containing a molten portion of a previous batch.

As alluded to above, $AlCl_3$ reacts with NaCl to form $NaAlCl_4$ as shown in equation 1. If $AlCl_3$ is in slight excess than the required molar ratio for this reaction, there is a possibility of formation of some $NaAl_2Cl_7$ in addition to $NaAlCl_4$. Therefore, it is desired to have a slight excess of NaCl in the reactant mixture, than the required molar ratio, so that sufficient NaCl is available in proximity of $AlCl_3$ for the reaction, and reaction (1) or (2) goes to completion, consuming all the $AlCl_3$. In certain embodiments, greater than about 0.5 molar percent excess of NaCl is added as a part of the reactant feed, when compared to the stoichiometric NaCl needed for the complete reaction to produce $NaAlCl_4$. In some embodiments, the excess NaCl added is greater than about 1 molar percent. In certain embodiments, the NaCl is in an amount that is in the feed is in excess in a range from about 1.5% to about 2.5% compared to a stoichiometric level of sodium chloride required for a complete chemical reaction producing $NaAlCl_4$. In certain specific embodiments, the NaCl is in greater than about 2 molar percent excess than stoichiometrically required for the reaction to produce $NaAlCl_4$.

Figure 5:
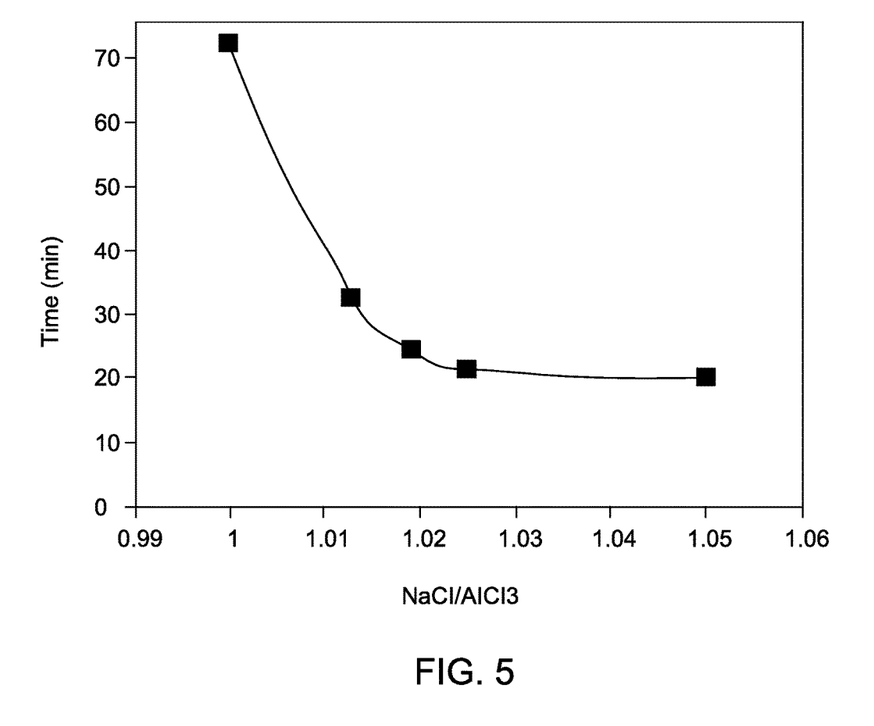
FIG. 5 shows time taken for completion of a reaction to form $NaAlCl_4$, with respect to the molar ratio of NaCl to $AlCl_3$, according to an embodiment of the present invention.

FIG. 5 shows time taken for completion of a reaction of NaCl and $AlCl_3$ to form $NaAlCl_4$ in a one liter capacity reactor, with respect to the molar ratio of NaCl to $AlCl_3$. It can be appreciated that there is no statistical difference in reaction time between 5 and 2.5 mole % excess of NaCl indicating that greater than 2.5% excess NaCl may not be advantageous for the reaction kinetics, while lesser amounts of NaCl than 2.5% excess result in longer reaction time. Additionally, a larger excess of NaCl than 3 molar percent may further disadvantageously introduce more moisture into the total reactants due to the presence of any water in a hygroscopic feed of NaCl. Higher than 3 molar percent excess of NaCl may also present challenges such as increased filter load and blinding of the filter with fine salt particulates during a filtration step after $NaAlCl_4$ product formation. Therefore, in one embodiment, the excess of NaCl in the reactant mixture is less than about 2.5 molar percent. The amount of NaCl dissolved in molten $NaAlCl_4$ may be controlled by the temperature at which the reaction mixture is filtered. It was observed that a small amount, such as less than 0.1 molar percent, of dissolved NaCl in $NaAlCl_4$ is beneficial for the electrolyte performance and hence is not considered as a contaminant.

The product $NaAlCl_4$, once formed, may also react with water, oxygen, and any organics present to form impurities. These impurities impart a yellow color to the $NaAlCl_4$ product at temperatures above 200° C. and below 300° C. Above 300° C., the organics may eventually carbonize and form black particulates. The yellow color caused by the exposure to water or oxygen may not diminish until additional aluminum is added to the product. Therefore, it is desirable to keep the reactor inert with a dry inert gas headspace such as nitrogen or argon during and after reaction (1). The inert gas used herein is desired to be of sufficient purity with respect to moisture, oxygen, and organics to prevent introducing any further product contamination.

$AlCl_3$ rapidly forms a significant vapor pressure at temperatures above 180° C. and sublimes at about 193° C. Therefore, it is advantageous to react the $AlCl_3$ with NaCl prior to a temperature of about 180° C. This may be accomplished by physical mixing of the $AlCl_3$ and NaCl reactant solids, in an inert dry environment, both prior to reactor charging and during reaction heating. An agitator or mixer may be employed in the reactor for continuous mixing of $AlCl_3$ and NaCl. In certain embodiments, a solid state reaction is carried out in the reactor to produce solid $NaAlCl_4$ at an intermediate temperature greater than the above-mentioned initial temperature and a temperature less than about 145° C. The intermediate temperature as used herein may be a constant temperature in between about 80° C. and about 145° C., or may be varied within the above-mentioned ranges. In one embodiment, the intermediate temperature is greater than about 120° C. In some embodiments, the temperature at which the solid state reaction is carried out is increased continuously or in a step-wise manner from the initial temperature up to a maximum temperature of 145° C. In some embodiments, the reaction in solid state at the intermediate temperature is continued until at least about 50% of all the $NaAlCl_4$ is formed. In one embodiment, the solid state reaction is carried out when the temperature is raised from about 80° C. to about 145° C. in duration of about 2-4 hours.

In one embodiment, the heating means of the reactor is a hot oil jacket. The temperature of the hot oil jacket may be controlled precisely and thereby controlling the temperature of the reactor. The charge inlet may have a size, shape, angle, and control means aiding a fast and inert addition of reactants into the reactor. In one embodiment, the charge inlet is at an angle larger than the angle of repose for the solid feed to the reactor and includes an isolation valve for the feed that is capped and configured to mate to a feed tank, thereby facilitating an inert addition of feed to the reactor. The charge inlet may also be equipped with a vibrator, such as, for example, an air vibrator, that is activated during feeding; and that ensures that all solid materials are fed into the reactor with no hold up in the charge inlet or a feed line leading to the charge inlet. In some embodiments, the solid materials may be charged via a rotary lock valve or a screw feeder. The vent may be connected to an aqueous sodium hydroxide (NaOH) or potassium hydroxide (KOH) or other caustic scrubber and condenser to scrub the outlet gas prior to analysis by an in-line gas chromatography instrument.

During operation, inert gas may be introduced into the reactor as a headspace purge gas or sub-surface sparge gas through a metal frit and measured through a flow-meter. In some embodiments, nitrogen is used for inert gas head-space purge. The rate of the inert gas head-space purge may be balanced to remove HCl and hydrogen from the reactor without causing too much of sublimate build-up and loss of $AlCl_3$ vapor. In some embodiments, nitrogen head-space purging is used with a rate such that an average nitrogen residence time is between about 0.05 hours to about 0.4 hours to effectively remove hydrogen chloride and hydrogen without causing $AlCl_3$ loss. The reactor may further include optional pressure regulators and a pressure transducer facilitating reaction in vacuum, if required. The system may include thermocouples for measuring liquid and headspace temperatures, the oil inlet and outlet temperatures and an overhead temperature.

The temperature of the reactor may be controlled by heating or cooling oil of the oil bath, disclosed in the exemplary embodiment. The sample port may have a heating provision that allows for drawing an unfiltered aliquot of the reaction mixture before, during, or after the reaction. A $Cl^-$ probe may also be inserted into the reactor through a port to monitor liquid reaction progress by comparison of chemical potentials of reactor product and probe reference. The probe may be specially designed for the reaction system described herein. Discharge of the products of the reactor can be made through the bottom discharge valve configured to have an inert gas back-pressure to displace the draining liquid. The filtration unit may be heated, for example, by wrapping electric heating tapes and insulation around the filter or filter housing.

Carrying out a solid state reaction to produce solid $NaAlCl_4$ is particularly advantageous as the HCl removal at this stage is easier than after the formation of $NaAlCl_4$ melt. It was experimentally found that HCl dissolved in the molten reaction mixture is more corrosive than HCl in gas phase and also more difficult to scavenge than in the solid state phase.

The solid $NaAlCl_4$ formed at the intermediate temperature may be subjected to an elevated temperature for melting and forming molten phase $NaAlCl_4$. Depending on the amount of unreacted $AlCl_3$, the reaction mixture starts melting at about 145° C., and is in a stable molten state above temperature of about 160° C. In certain embodiments, the solid reaction mixture formed is subjected to an elevated temperature greater than about 150° C., to produce molten phase $NaAlCl_4$. The reactions for the formation of $NaAlCl_4$ and other reactions for producing and scavenging HCl may continue at the elevated temperature.

The reactions (1) and (2) forming $NaAlCl_4$ are exothermic reactions, thereby supporting the heat-input to the reactor for further reaction. Hence, an uncontrolled heating of the reactor during reactions (1) and (2) would result in a thermal runaway, affecting safety of the reactor and purity of the product obtained, further leading to possible reactants losses.

Melting of $NaAlCl_4$ is an endothermic process taking up a portion of the heat supplied to the reactor. In some embodiments, the heat produced from the exothermic reaction (1) or (2) is deliberately utilized to melt the solid state $NaAlCl_4$, thereby saving energy and preventing thermal runaway. Therefore, in one embodiment, an external temperature applied for melting the $NaAlCl_4$ is maintained at less than about 145° C. Thus, in one embodiment, the solid $NaAlCl_4$ formed absorbs the reaction heat to reach temperature greater than about 150° C. to produce molten phase $NaAlCl_4$, while the external heating supplied to the reactor is kept at a temperature less than about 145° C.

The molten phase $NaAlCl_4$ produced may have a yellow color depending on many impurities present in the melt form. Any residual HCl and/or oxy-chloride species formed from exposure of the reactants or product to oxygen and/or water vapor may turn the product melt to a yellow color of varying shades. In addition, exposure to iron or other metal cations can cause metal chloride formation, further discoloring the product melt. The iron or other metal cations may get introduced to the melt due to a corrosion of the reactor or any other part that gets exposed to the reaction mixture. Therefore, it is desirable to conduct the reaction in a reactor for which the reaction mixture is as non-corrosive as possible, at any given point of the product formation. Further, any residual hydrocarbons or other organic materials present in processing equipment can react with the product to form yellow or brown color bodies. Therefore, a discoloration of the molten $NaAlCl_4$ is an indication of an extent of impurities present in the melt. A substantially clear and colorless molten $NaAlCl_4$ that has been reacted to meet chemical potential requirements is considered to be free of discoloring contaminants, and pure.

In one embodiment, color of the $NaAlCl_4$ product is determined using a light absorption spectrum of the $NaAlCl_4$ melt. A transfer function between product color and product purity is established with a relative melt yellowness index (MYI) having a tolerance of about 30%. The accuracy of the MYI measurement was found to enhance when the product is particularly free of any particulate matters. In the MYI scale, pure water has a relative MYI of 0.00 while 2.00 is the maximum reading of the scale. Any melt with an MYI of <0.20 is considered to be of sufficiently low color (and thus high purity) as to meet $NaAlCl_4$ product specification. Molten $NaAlCl_4$ product of such quality is appreciated by a human eye as a colorless liquid. In some embodiments, a yellowness index MYI of the high purity $NaAlCl_4$ produced using the methods disclosed herein is less than about 0.2.

Figure 6:
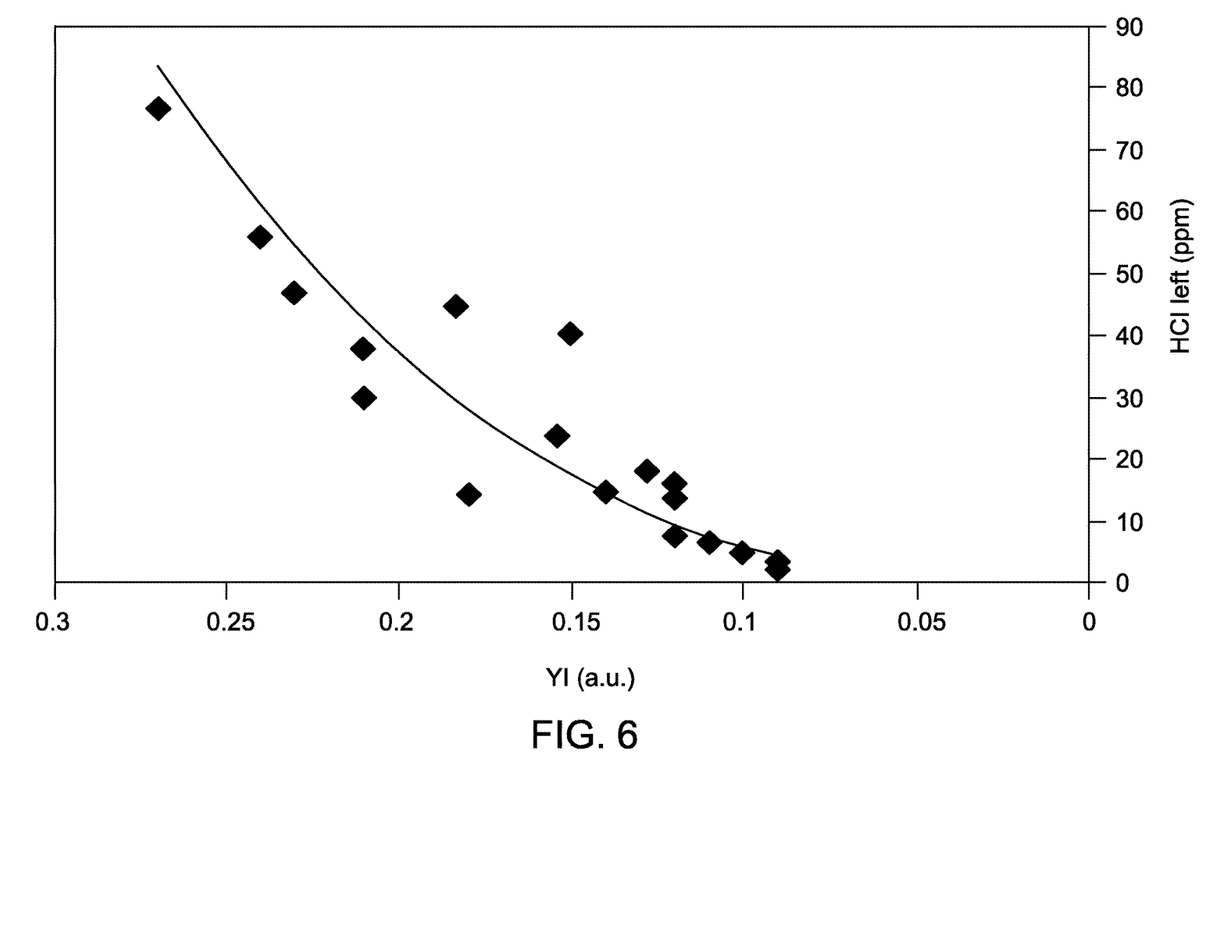
FIG. 6 shows a relationship between an amount of HCl in a melt and the measured MYI index of the melt, according to an embodiment of the present invention.

FIG. 6 shows a graph of parts per million (ppm) of HCl remaining versus MYI index of a melt that does not have any air contamination. It can be seen that molten $NaAlCl_4$ with MYI of about 0.2 contains about 40 ppm HCl while molten $NaAlCl_4$ with MYI of about 0.1 contains about 5 ppm HCl. Measurement of MYI at different intervals during reaction helps in monitoring and determining reaction completion and thus avoids the need for prolonged cycle time and any need for post treatment for purifying the $NaAlCl_4$ obtained. A liquid sample may be inertly taken from the reactor at different intervals, either as an unfiltered sample or as a filtered sample to monitor reaction color change and turbidity as a function of time. These samples may be transferred to the UV-VIS unit for MYI measurement. These samples may further be solidified and stored in inert atmosphere for any post reaction analyses.

As alluded above, the discoloration of the molten $NaAlCl_4$ is due to impurities present in the product. During production of $NaAlCl_4$ by the disclosed method, extreme care is taken to minimize the reactant exposure to moisture, oxygen, and any kind of organics. Therefore, in some embodiments, clearing the molten $NaAlCl_4$ from the HCl impurity produces the $NaAlCl_4$ that meets the required MYI level. In certain embodiments, the method for the preparation of high purity $NaAlCl_4$ includes a step of holding the reactor at a raised temperature greater than about 165° C., to substantially complete formation of colorless $NaAlCl_4$. During this holding time, the agitation may be on, and the reaction between the aluminum metal and HCl and subsequent evolution of hydrogen from the system is allowed to complete. In some embodiments, the reactor is held at the raised temperature at least for about 2 hours. In certain embodiments, the reactor temperature may be further increased to greater than about 180° C. for the completion of reaction, melting, and removal of impurities. In a further embodiment, there can be a holding step at a temperature greater than 180° C. for ensuring reaction completion and product purity.

As disclosed previously, the MYI data of the filtered product may be used to find out the reaction completion. In some embodiments, it was found that the reaction for the production of pure $NaAlCl_4$ is completed within 3-5 hours after melting. Thus, in some embodiments of using the disclosed process, a high purity $NaAlCl_4$ is produced within about 6 hours from complete melting of reaction mixture.

During the heating and subsequent holding steps, the gas phase is monitored for hydrogen release. In addition, pH of the evolved gas is measured for emanating HCl from the reaction mixture. The HCl emanating herein may be a small quantity of HCl that is not reacted with the aluminum flake, and might be removed with the purge gas. In some embodiments, determination of the completion of formation of colorless $NaAlCl_4$ is measured by monitoring an evolution of hydrogen, hydrogen chloride, or a combination of hydrogen and hydrogen chloride, from the reactor. The HCl emanated may be scrubbed before measuring hydrogen in GC. Further, in some embodiments, at a point where the majority of the HCl has been removed and the hydrogen evolution is slow, a probe is used to monitor reaction completeness as a function of time by comparison of chemical potential of aluminum in a high-purity reference standard $NaAlCl_4$ saturated with NaCl with aluminum potential in contact with molten $NaAlCl_4$ in the reactor. When the probe reading reaches lesser than 10 mV variation from zero, and the hydrogen release is below the GC detection limit in the output gas, the reaction is considered to be complete.

Once the reaction is complete, the melt liquid of the reaction is filtered to remove residual reactants and by-products. In some embodiments, filtration of the melt liquid is carried out under inert gas pressures of up to about 2.4 atm. It is desirable to avoid any contamination of the product by the filter material. Further, the filter material used for the filtration step is desired to be of high strength to withstand the pressure of filtration, still producing a desirable flux. For example, it was observed that the pressure drop across a filter using sintered nickel metal was too high to be used for industrial production.

In some embodiments, a filter unit has a Ni-plated 316 SS housing with top and bottom connectors and central body. The top and bottom connectors are sealed with Teflon gaskets and the filter media sits in between the main body and bottom connector. In certain embodiments, the filter media includes a teflon fabric material backed by a support of Ni, HC-276 or other high Ni content alloy mesh screen, or a HC-276 or other high Ni content alloy metal plate with holes drilled into it to allow for liquid flow. The alloy used is chosen for corrosion resistance and increased strength at temperature of filtering, thus minimizing product impurity and allowing for faster filtration at a practically high pressure of filtration. In some embodiments, the support media is used to prevent break out of the fabric due to excessive stress created by the internal pressure of the liquid, and does not provide any filtration to remove the impurities. In some embodiments, the Teflon fabric has the pore size in a range from about 1 μm to about 5 μm. In certain embodiments, the filter includes a Ni-plated 316 SS body and a filter media of a Teflon membrane and Teflon fabric material of about 1 μm pore size. The filter unit may be heated by a hot oil jacket, coil, or by wrapping electric heating tapes and insulation around the filter housing, and the temperature may be controlled by using a heating loop connected to a reactor computer system. In some embodiments, the reactor contents are filtered at a temperature greater than about 180° C.

The filter unit may be pressurized to a desired value through a pressurizing mechanics built-in with the unit. In some embodiments, the filter unit is pressurized by filling-in an inert gas through a separate inlet than the reactor inlet. In certain embodiments, the reactor contents are filtered at a pressure greater than about 0.8 bar-gauge to ensure a substantially complete filtration of the reactor contents. In one embodiment, a yield of the high purity $NaAlCl_4$ produced after filtration is more than about 97% of the theoretically estimated value. The contents of the reactor may be continuously stirred or agitated during filtering. The filter media may be cleaned and reused for the filtration of another batch.

The production process disclosed herein in different embodiments has increased the speed, yield and quality of the $NaAlCl_4$ produced, when practiced in a sufficiently high quantity. The cycle time has been reduced from several days to few hours with a better product color and clarity. Analytical methods for monitoring the reaction and for product analyses were described to certify final product specifications. The improved process disclosed herein is scalable and capable of producing commercially viable quantities of product per year with an appropriately sized reactor and filter system. In addition, the process will produce a material with improved color and clarity due to the ability to add larger amounts of initial Al flake and subsequently filter the material.

For example, a $NaAlCl_4$ product produced in about 19 liter capacity reactor system using certain embodiments disclosed above, resulted in a yield of greater than about 98% of the theoretically estimated value considering the initial reactant concentration, with an average MYI of less than 0.08 and metal impurity less than about 9 ppm, in a time span (including filtering) of less than about 9 hours with about 45% cost reduction compared to a standard adapted process. A similar experimental production of $NaAlCl_4$ in a 150 liter capacity reactor resulted in a yield of greater than about 97.7% of the theoretically estimated value considering the initial reactant concentration, with an average MYI of less than 0.1, and metal impurity less than about 5 ppm, in a time span (including filtering) of less than about 9 hours with about 45% cost reduction compared to a standard adapted process. Therefore, it can be seen that the process of production of $NaAlCl_4$ adopted herein is a completely scalable process resulting in high yield, high purity production of $NaAlCl_4$.

The production method disclosed in different specific embodiments hereinabove may be modified to produce high purity $NaAlCl_4$ in a semi-continuous mode. Depending on the reactor volume, the reactor may be charged, controlled reactions may be conducted in the reactor, and the product may be filtered in multiple cycles, allowing for the desired intermediate steps for the formation and purification of the $NaAlCl_4$. In the semi-continuous mode, subsequent charging (than the first charging) may be carried out at temperature greater than about 165° C.

In certain embodiments of producing high purity $NaAlCl_4$, a mixed feed having aluminum chloride, sodium chloride, and aluminum metal is charged to the reactor. In some embodiments, the mixed feed has an intimate mixture of all the three reactants—aluminum chloride, sodium chloride, and aluminum metal. In certain embodiments, the reactants containing the intimate mixture of feed including aluminum metal is charged to the reactor at an initial temperature less than about 80° C. and a solid state reaction is carried out in the reactor to produce solid $NaAlCl_4$ at an intermediate temperature. The temperature may be raised to melt the formed solid $NaAlCl_4$ and further may be maintained for about 2-3 hours to complete the reactions to form and purify (by removing HCl) $NaAlCl_4$.

The formed molten $NaAlCl_4$ may be filtered at a temperature greater than about 180° C. to further remove any unreacted reactants such as, for example, NaCl, or any other filterable by products. In certain embodiments, a portion of the melt is purposefully retained in the reactor without subjecting to the filtering process. This retained melt (alternately, "heel") is used as an initial solution to which the mixed feed of a next batch is added to. Thus, a subsequent charging of the mixed feed (than the mixed feed of the first batch) would be to an already purified $NaAlCl_4$ melt in the reactor. This is particularly advantageous as the further, subsequent reactions for the formation of purified $NaAlCl_4$ were found to be occurring faster, and providing the pure $NaAlCl_4$ melt in a shorter time as compared to the product obtained by charging the subsequent mixed feed to the empty reactor. In some embodiments, at least about 15 vol % of melt liquid present at the time of reaction completion from a previous production is retained for charging a subsequent production. In some embodiments, the melt that is retained in the reactor before the next charging is in a range from about 15 volume % to about 30 volume %. This cycle of forming, purifying, filtering partial contents of the reactor, and charging the subsequent feed to the retained melt (heel) in the reactor may be continued in a semi-continuous mode.

In some embodiments, in the semi-continuous mode, the reactor temperature is controlled to retain a reaction temperature of a subsequent feed in a range from about 156° C. to about 175° C., so that freezing of the reactor contents is avoided and losses of the reactants are minimized. In some embodiments, the rate of addition of the intimate mixture of reactant solids is controlled to maintain the reactor content in the liquid form at a temperature in a range from about 160° C.-180° C. After addition is complete, the reaction mixture is kept for about 2-3 hours and filtered, leaving a heel in the reactor.

Without being bound by any theory, it is believed that the faster rate of formation of purified $NaAlCl_4$ in the semi-continuous mode as compared to a single batch process is due to avoidance of formation of stable HCl complexes with aluminum oxychlorides whose reaction with aluminum surface takes much longer time than scavenging freely dissolved HCl. The aluminum present in the heel may not have any oxide surface, and thus readily scavenges the HCl that is formed. In some embodiments, the amount of aluminum added with the mixed feed is adjusted to account for the presence of un-oxidized aluminum present in the heel. For example, in one embodiment, an amount of aluminum in the mixed feed of a subsequent charging is lesser than the amount of aluminum present in the mixed feed of the first charging of a semi-continuous process for producing a pure $NaAlCl_4$.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for the preparation of high purity $NaAlCl_4$, comprising:
    charging a feed comprising an intimate mixture of aluminum chloride, sodium chloride, and aluminum metal to a reactor at an initial temperature less than about 80 degree Celsius;
    carrying out a solid state reaction at an intermediate temperature less than about 145 degree Celsius, to form solid $NaAlCl_4$;
    melting the solid $NaAlCl_4$ at an elevated temperature greater than about 150 degree Celsius, to produce molten phase $NaAlCl_4$;
    holding the reactor at a raised temperature greater than about 165 degree Celsius, to substantially complete formation of colorless $NaAlCl_4$; and
    filtering reactor contents at a final temperature greater than about 165 degree Celsius, to remove residual reactants and by-products.

2. The method of claim 1, further comprising introducing excess sodium chloride in the feed in an amount greater than about 0.5%, compared to a stoichiometric level of sodium chloride required for a complete chemical reaction producing $NaAlCl_4$.

3. The method of claim 1, wherein an average surface area of the aluminum metal is greater than about 0.05 $m^2$ per 1 kg of $NaAlCl_4$.

4. The method of claim 3, further comprising restricting a total residual moisture in the intimate mixture to less than about 1500 ppm.

5. The method of claim 1, wherein the solid state reaction at the intermediate temperature is carried out until at least about 50% of $NaAlCl_4$ is formed.

6. The method of claim 1, further comprising determining completion of colorless $NaAlCl_4$ formation by measuring an evolution of hydrogen, hydrogen chloride, or a combination of hydrogen and hydrogen chloride from the reactor.

7. The method of claim 6, further comprising removing at least 50% of the total hydrogen chloride evolved, during the solid state reaction.

8. The method of claim 6, further comprising monitoring the level of hydrogen chloride in the final reaction mixture by measuring the evolution of hydrogen in the reactor and the pH change in the scrubber.

9. The method of claim 1, further comprising applying an external temperature to the reactor wherein the external temperature applied in melting the $NaAlCl_4$ is maintained at less than about 145 degree Celsius.

10. The method of claim 1, wherein the reactor is held at the raised temperature at least for about 2 hours.

11. The method of claim 1, wherein the reactor contents are filtered at a pressure greater than about 0.8 bar-gauge and at a temperature greater than about 180 degree Celsius.

12. The method of claim 1, further comprising an inert gas head-space purging with a rate such that an average purge gas residence time is between about 0.05 hours to about 0.4 hours to effectively remove hydrogen chloride and hydrogen without causing reactant loss.

13. The method of claim 1, wherein a yield of the high purity $NaAlCl_4$ is more than about 97% of the theoretically estimated value.

14. The method of claim 1, wherein a yellowness index of the high purity $NaAlCl_4$ produced is less than about 0.2.

15. The method of claim 1, wherein the high purity NaAlCl$_4$ is produced within 6 hours from melting of the solid NaAlCl$_4$.

16. The method of claim 1, further comprising producing the high purity NaAlCl$_4$ in a semi-continuous mode.

17. The method of claim 16, further comprising retaining at least about 15 vol % of liquid from a previous production during charging for a subsequent production.

18. A method for the preparation of high purity NaAlCl$_4$, comprising:
   charging a feed comprising an intimate mixture of aluminum chloride, sodium chloride, and a high surface area aluminum metal to a reactor at an initial temperature less than about 50 degree Celsius;
   carrying out a solid state reaction at an intermediate temperature less than about 145 degree Celsius, to form solid NaAlCl$_4$;
   melting the solid NaAlCl$_4$ at a raised temperature greater than about 150 degree Celsius to produce molten phase NaAlCl$_4$;
   holding the reactor at a raised temperature greater than about 165 degree Celsius, to substantially complete formation of colorless NaAlCl$_4$; and
   filtering reactor contents at a final temperature greater than about 180 degree Celsius and a pressure greater than about 0.8 bar-gauge to remove residual reactants and by-products, wherein
      the sodium chloride in the feed is in excess in an amount greater than about 1%, compared to a stoichiometric level of sodium chloride required for a complete chemical reaction producing NaAlCl$_4$; and
      wherein an average surface area of the aluminum metal flakes in the feed is greater than about 0.05 m$^2$/kg of produced NaAlCl$_4$.

19. A method for the preparation of high purity NaAlCl$_4$ in a semi-continuous mode, comprising:
   charging a feed comprising an intimate mixture of aluminum chloride, sodium chloride, and aluminum metal to a reactor at an initial temperature less than about 80 degree Celsius;
   carrying out a solid state reaction at an intermediate temperature less than about 145 degree Celsius, to form solid NaAlCl$_4$;
   melting the solid NaAlCl$_4$ at an elevated temperature greater than about 150 degree Celsius, to produce molten phase NaAlCl$_4$;
   holding the reactor at a raised temperature greater than about 165 degree Celsius, to substantially complete formation of colorless NaAlCl$_4$;
   filtering reactor contents at a final temperature greater than about 180 degree Celsius and a pressure greater than about 0.8 bar-gauge, retaining at least about 15 volume percent of the contents in the reactor;
   initiating the charging of a subsequent feed comprising an intimate mixture of aluminum chloride, sodium chloride, and aluminum metal to the reactor at a temperature greater than about 165 degree Celsius;
   continuing the charging in a controlled rate to keep a reaction temperature of the subsequent feed in a range from about 156 degree Celsius to about 190 degree Celsius, to avoid freezing reactor contents and to minimize reactant losses;
   holding the reactor at a raised temperature greater than about 165 degree Celsius, to substantially complete formation of colorless NaAlCl$_4$; and
   repeating the filtering, charging and holding steps to semi-continuously form the high purity NaAlCl$_4$.

20. The method of claim 19, further comprising introducing excess sodium chloride in the feed in an amount greater than about 1%, compared to a stoichiometric level of sodium chloride required for a complete chemical reaction producing NaAlCl$_4$.

* * * * *